(12) United States Patent
Löbbert

(10) Patent No.: US 12,405,221 B2
(45) Date of Patent: *Sep. 2, 2025

(54) OPTOCHEMICAL SENSOR AND METHOD FOR MEASURED VALUE CORRECTION

(71) Applicant: Endress+Hauser Conducta GmbH+Co. KG, Gerlingen (DE)

(72) Inventor: Andreas Löbbert, Waldheim (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,691

(22) Filed: Apr. 16, 2024

(65) Prior Publication Data

US 2024/0264086 A1    Aug. 8, 2024

Related U.S. Application Data

(63) Continuation of application No. 17/225,210, filed on Apr. 8, 2021, now Pat. No. 11,971,360.

(30) Foreign Application Priority Data

Apr. 8, 2020  (DE) .................... 10 2020 109 901.0

(51) Int. Cl.
G01N 21/77       (2006.01)
G01N 21/27       (2006.01)
G01N 21/64       (2006.01)

(52) U.S. Cl.
CPC .......... *G01N 21/77* (2013.01); *G01N 21/274* (2013.01); *G01N 21/6428* (2013.01);
(Continued)

(58) Field of Classification Search
None
See application file for complete search history.

(56) References Cited

U.S. PATENT DOCUMENTS 5,489,536 A * 2/1996 Ekechukwu ....... G01N 33/1826
422/562
2017/0184499 A1 * 6/2017 Höhne ................. G01N 21/643

FOREIGN PATENT DOCUMENTS

KR         101259068 B1 *  4/2013

OTHER PUBLICATIONS

Translation of KR 101259068 B1, Ekechukwu; Amy A, Feb. 6, 1996 (Year: 1996).*

* cited by examiner

*Primary Examiner* — Henry H Nguyen
(74) *Attorney, Agent, or Firm* — Christopher R. Powers; Endress+Hauser (USA) Holding, Inc.

(57) ABSTRACT

An optochemical sensor for determining a measurement signal, which correlates with a concentration of an analyte of a measuring fluid, comprises: a sensor cap including a sensor spot, wherein the sensor spot contains at least one analyte-sensitive indicator dye and a state description indicator which reflects the aging state of the sensor spot; a radiation source to radiate excitation radiation onto the sensor spot and to excite a luminescence of the indicator dye; a radiation receiver to receive reception radiation emitted by the sensor spot; and a sensor circuit electrically connected to the radiation source and the radiation receiver and configured to control the radiation source and to generate, based on an intensity of luminescence and/or a phase angle of luminescence, a measurement signal representing the concentration of the analyte in the measuring fluid in contact with the sensor spot.

16 Claims, 3 Drawing Sheets

(52) U.S. Cl.
CPC ... *G01N 21/645* (2013.01); *G01N 2021/6432* (2013.01); *G01N 2021/6439* (2013.01); *G01N 2021/6484* (2013.01); *G01N 2021/772* (2013.01)

OPTOCHEMICAL SENSOR AND METHOD FOR MEASURED VALUE CORRECTION

CROSS-REFERENCE TO RELATED APPLICATION

The present application is related to and claims the priority benefit of German Patent Application No. 10 2020 109 901.0, filed Apr. 8, 2020. Further, the present application is a continuation of U.S. patent application Ser. No. 17/225,210, filed Apr. 8, 2021. The entire contents of both foregoing applications are incorporated herein by reference.

TECHNICAL FIELD

The present disclosure relates to an optochemical sensor for measuring a measurand correlating with a concentration of an analyte in a measuring fluid.

BACKGROUND

Although the present disclosure is explained below with reference to an oxygen sensor, the inventive concept is not intended to be limited to sensors that operate according to the principle of luminescence quenching. Rather, other process variables, particularly concentrations of certain analysts, such as ions, molecules, gases or other chemical compounds, pH value or temperature are also measurable by such an arrangement with conventional modifications. Measuring devices that are suitable for determining the corresponding process variables are offered and sold by the Endress+Hauser group of companies in a wide variety of variants.

Such a sensor may include, for instance, a sensor head that contains an optical sensor element and that is connected to a housing that contains a data processing unit, wherein the optical sensor element is irradiated with light by a light source. The light is reflected by the optical sensor element in a specific light characteristic, possibly after conversion, is detected by a light receiver, and a signal of the light receiver representative of the light characteristic is evaluated by the data processing unit. The "optical sensor element" is often also referred to as a sensor spot or as a sensor membrane according to its type.

A conventional sensor is, for instance, the digital oxygen sensor "Memosens® COS81D."

Sensor spots age over time by photobleaching due to photooxidation by the generated singlet oxygen, during oxygen measurement or by excitation with high-energy radiation (e.g., UV light) or ordinary aging in air. This results in nanocracks and microcracks in the membrane in the early stage of aging, which cracks can absorb solvents like water and thereby increasingly weaken the measuring properties and the stability of the membrane. This phenomenon can be observed in optical sensors, but, particularly also in liquid membranes.

With increasing aging, optical sensors suffer from the penetration of water. This leads to sensor drift, e.g., as a rule, to smaller measured values over time in air in the case of optical oxygen measurement. A further disadvantage is the detachment of the membrane from the substrate surface of the sensor cap. This is particularly not desirable in the food or pharmaceutical sector. Gaps or cracks once formed lead to accelerated aging, particularly in the case of constant temperature changes in aggressive corrosive media. It is therefore advantageous to detect these defects early and to not wait until total failure.

In the case of ion-selective electrodes and long-term use of the sensor, water penetrates into the membrane and the plasticizer is washed out at the same time. This also leads to changed measured values and, as a rule, to lower transconductances.

SUMMARY

The object of the present disclosure is to detect the necessity of replacing a sensor or individual components, particularly the sensor spot, on a timely basis.

The object is achieved by a an optochemical sensor for determining a measurement signal, which correlates with a physical or chemical measurand of a measuring fluid, particularly a concentration of an analyte, comprising: a housing, particularly a cylindrical housing, which has at least one immersion region configured for dipping into the measuring fluid; a sensor cap, particularly a cylindrical sensor cap, with at least one sensor spot, wherein the sensor cap is arranged on the immersion region of the housing, wherein the sensor spot is arranged on a lateral surface, particularly a front side, of the sensor cap, wherein the sensor spot contains at least one analyte-sensitive indicator dye, and wherein the sensor spot contains a state description indicator, wherein the state description indicator reflects the aging state of the sensor spot; at least one radiation source arranged in the housing to radiate excitation radiation onto the sensor spot and to excite a luminescence of the indicator dye; at least one radiation receiver arranged in the housing to receive reception radiation emitted by the sensor spot; and a sensor circuit which is arranged in the housing and which is electrically connected to the radiation source and the radiation receiver, wherein the sensor circuit is configured to control the radiation source and to generate, on the basis of an intensity of luminescence and/or a phase angle of luminescence, a measurement signal representing the physical or chemical measurand in the measuring fluid in contact with the sensor spot.

In the context of the present disclosure, the term "analyte-sensitive indicator dye" is intended to mean a dye by means of which the physical or chemical measurand can be determined. Suitable physical or chemical measurands include, for example, an oxygen concentration, the pH value, a concentration of nitrate, chloride, ammonium, or potassium, a temperature, pressure or viscosity.

One embodiment provides that the optical sensor is an optical oxygen sensor.

One embodiment provides that the optical sensor is an ion-selective electrode. One embodiment provides that the optical sensor is an optical pH sensor.

An "optochemical sensor" within the meaning of this application is thus a "classic" optochemical sensor, such as an oxygen sensor, a sensor with at least one ion-selective electrode or an optical pH sensor. However, this term also includes a hybrid of an electrochemical sensor, here a potentiometric sensor, with an optical waveguide for the state description indicator.

One embodiment provides that the state description indicator is adapted to absorb a polar solvent, particularly water.

One embodiment provides that the state description indicator is a Reichardt's dye, particularly azomerocyanine betaines, merocyanines, a europium complex or benzodiazaboroles.

One embodiment provides that the indicator dye and/or the state description indicator is bonded, particularly covalently bonded, in a matrix or is poorly water-soluble, particularly in the case of the design of the state description indicator as europium complex.

One embodiment provides that the sensor comprises a first radiation source for radiating excitation radiation onto the sensor spot and for exciting a luminescence of the indicator dye, and a second radiation source for radiating excitation radiation onto the sensor spot and for exciting a luminescence of the state description indicator.

One embodiment provides that the first radiation source is a red LED and the second radiation source is a blue LED.

One embodiment provides that the sensor comprises a first radiation source for radiating excitation radiation onto the sensor spot and for exciting a luminescence of the indicator dye, a second radiation source for radiating excitation radiation onto the sensor spot, and a transmission receiver, which receives excitation radiation from the second radiation source after its passage through the sensor spot and transmits it to a radiation receiver.

One embodiment provides that the radiation source is a white light LED.

One embodiment provides that the sensor comprises at least one light guide, which conducts excitation radiation from the radiation source in the direction of the removable cap.

The object is furthermore achieved by methods using an optochemical sensor as described above, wherein the method for carrying out a measured value correction is suitable for determining a measurement signal, which correlates with a physical or chemical measurand of a measuring fluid. The method comprises the steps of: determining the measurement signal, which correlates with a physical or chemical measurand of a measuring fluid, by means of an analyte-sensitive indicator dye in the sensor spot of the sensor; determining the aging state of the sensor spot by a state description indicator in the sensor spot; and correcting the measurement signal as a function of the aging state.

The aging is thus measured by means of the state description indicator, wherein the raw values are used for the age-related measured value correction of the raw values from the determination of the physical or chemical measurand, so that age-related changes in the membrane due to solvent inclusions, particularly water, are eliminated and the correct value of an unaged membrane is indicated.

BRIEF DESCRIPTION OF THE DRAWINGS

This is explained in more detail with reference to the following figures.

In the figures, the same features are identified by the same reference signs.

DETAILED DESCRIPTION

Figure 1:
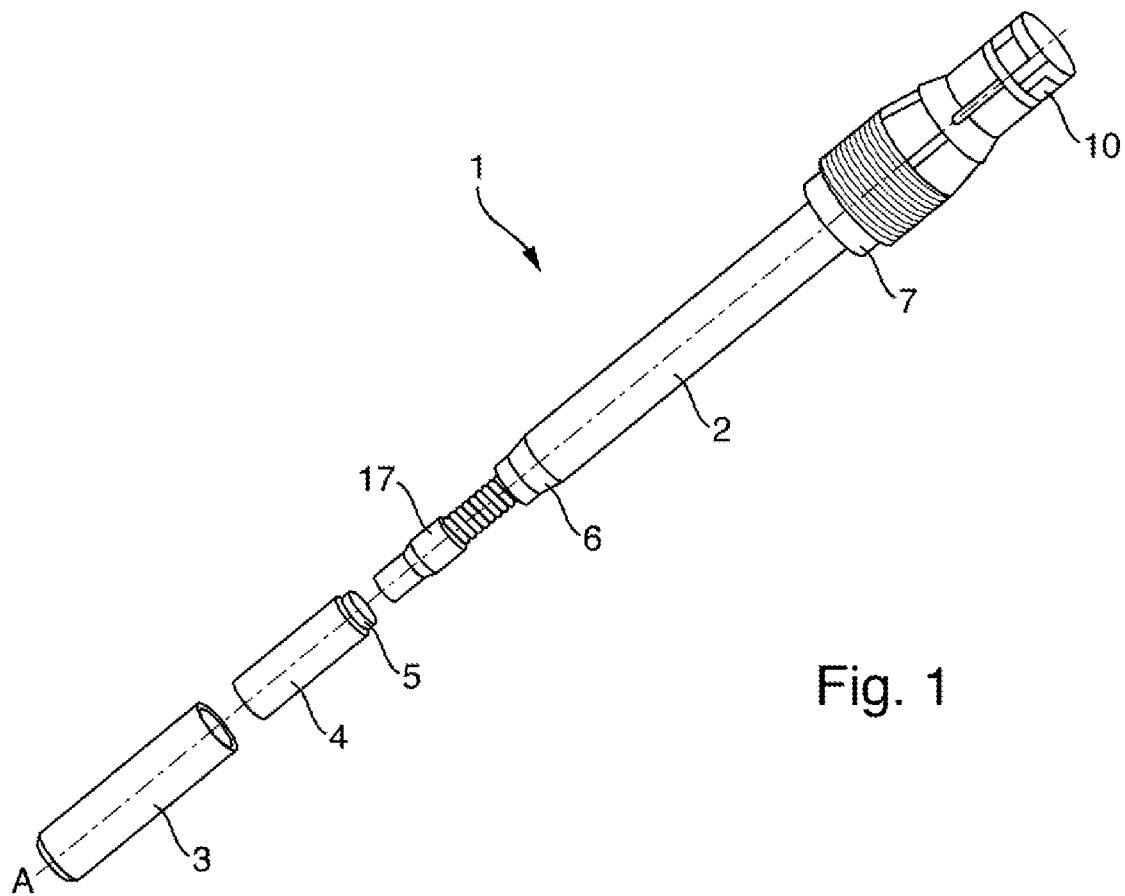
FIG. 1 shows the claimed optical sensor in a schematic overview.
Figure 2:
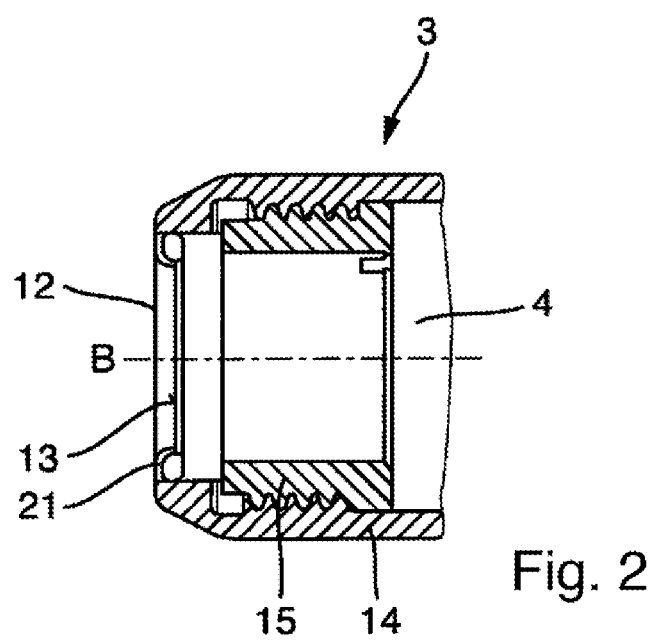
FIG. 2 shows a cap of the claimed sensor.

FIG. 1 schematically depicts an optochemical sensor 1. In the present exemplary embodiment, the sensor 1 is configured to determine a concentration of a gas dissolved in a measuring liquid 28 (also called measuring medium or measuring fluid in this disclosure), e.g., dissolved oxygen. The sensor 1 has a housing 2 which, in the exemplary embodiment shown here, has an essentially cylindrical form. The diameter is, for example, 12 mm or 40 mm. The housing 2 comprises a sensor membrane 13 intended for contact with a measuring medium 28, as shown in FIG. 2. The sensor membrane 13 comprises, inter alia, a luminescent dye which is embedded in a polymer matrix and the luminescence of which is quenched by the analyte, for example, oxygen here. In an embodiment, the luminescent dye may have the property that its luminescence is enhanced by the analyte. This may be the case, for example, in optical pH detection with luminophores on the basis of the PET (photoinduced electron transfer) effect. The sensor membrane 13 may have a stabilizing substrate and a plurality of layers applied to the substrate. The membrane 13 is also referred to as a sensor spot.

A radiation source 8 (direction of light indicated by arrow), which can comprise one or more LEDs, for example, is arranged in the housing 2. A radiation receiver 9 (direction of light indicated by arrow), which can comprise one or more photodiodes, for example, is arranged in the housing 2. The radiation source 8 and the radiation receiver 9 (see also, the cross-section drawing in FIG. 3) are located in a receiving and transmitting unit 7. The housing 2 also contains a light guide 17 that conducts radiation emitted by the radiation source 8 to the sensor membrane 13 and conducts luminescence radiation emitted by the luminescent dye embedded in the sensor membrane 13 to the radiation receiver 9. The further (simplified) light path in the membrane 13 is drawn in dashed lines. The light guide 17 may comprise one or more optical fibers. For example, the light guide 17 is formed by a fiber bundle which has a first arm connecting the radiation source 8 to the sensor membrane 13 and which has a second arm connecting the radiation receiver 9 to the sensor membrane 13. The optical sensor 1 has a sleeve-shaped housing section as part of the sensor housing 2, which section is connected to the receiving and transmitting unit 7. The light guide 17 is guided within the housing section. One possible embodiment of the light guide 17 includes a glass rod. The glass rod is correspondingly bent, drawn, etc. into shape. The two individual arms then combine to form a single glass rod.

The radiation source 8 and the radiation receiver 9 are electrically connected to a sensor circuit 18. The sensor circuit 18 is configured to excite and control the radiation source 8 to emit radiation. The sensor circuit 18 is furthermore configured to receive and process signals of the radiation receiver 9, which represent the luminescence radiation received by the radiation receiver 9. The processed signals serve as measurement signals of the sensor 1 and can be output by the sensor circuit 18 via an interface 10 to a superordinate unit, for example, a measurement transmitter, a controller, a computer or an operating device. The interface 10 may be a cable connection fixedly connected to the sensor circuit 18, a detachable plug connection with galvanic contacts or a galvanically isolated, particularly inductively coupling, plug connection. Via the cable 19 connected to the interface 10, the sensor circuit 18 can be supplied with energy, also for operating the radiation source 8. The sensor circuit 18 can furthermore transmit signals, particularly data, to the superordinate unit via the cable 19 and, optionally, receive signals, particularly data, from the superordinate unit. The interface 10 is sold by the applicant under the trade name Memosens®.

The detection of measured values and the evaluation of the signals of the radiation receiver 8 for determining a measured value can be divided between the sensor circuit 18 and the superordinate unit. For example, the sensor circuit 18 itself may be configured to control the radiation source 8. For this purpose, sensor circuit 18 can comprise a microcontroller that executes a computer program, which is stored in a memory of the sensor circuit 18 and serves to control the radiation source 8 in order to detect measured values. Alternatively, at least part of the functions of the controller may also be performed by the superordinate unit, which then sends corresponding control signals for actuating the radiation source 8 to the sensor circuit 18. Accordingly, in order to process the signals detected by the radiation receiver 8, the microcontroller can execute a computer program that is stored in a memory of the sensor circuit 18 and that serves to evaluate the signals in order to determine measured values. The correspondingly processed signals can be output as measurement signals representing the measured values to the superordinate unit via the interface 10.

The sleeve-shaped housing section is connected to an optical waveguide mount 4 and a first thread 5, which is connected to a second thread 6 at a distal end of the housing section 2.

A removable cap 3 is fitted onto the optical waveguide mount 4 or connected via a thread. As shown in FIG. 2, the sensor cap 3 includes the sensor membrane 13 as to contact the medium. The removable cap 3 is essentially cylindrical. The removable cap 3 has a housing shell 14 and a longitudinal axis B, which lies on the longitudinal axis A of the sensor 1. The membrane 13 is arranged on the front side 12 of the shell 14 of the cap 3. In principle, an arrangement of the membrane 13 on a side face of the cap 3 is also possible, as disclosed, for example, in DE 102019122096.3.

The sensor cap 3 has an annular insert 15 with which the sensor membrane 13 is pressed from an interior surrounded by the housing shell 14 against an edge-side projection and/or an edge-side seal 21.

In this manner, the sensor membrane 13 forms the front side 12 of the sensor cap 3 and is provided for contact with the medium to be measured, e.g., a liquid, particularly an aqueous liquid.

Accordingly, the sensor membrane 13 is arranged on a front side 12 of the sensor cap 13 in contact with the medium, wherein "in contact with the medium" within the scope of the present disclosure means that, when the optical sensor 1 is used as intended, the front side 12 is provided to be in contact with the measuring medium 28. The sensor membrane 13 contains luminophore molecules, which serve as indicator dye of the sensor 1. The molecules of the indicator dye are covalently bonded to a polymer matrix material of a membrane layer of the sensor membrane 13.

The sensor membrane 13 has luminophore molecules that are embedded in a matrix material. In contact with the measuring liquid 28 containing the analyte of a specific concentration, the analyte penetrates into the polymer matrix and interacts with the luminescent dye. If the luminescent dye is excited by radiation of the radiation source 8 to emit luminescence radiation, the luminescence is quenched as a function of the concentration of the analyte, for example, by oxygen in the embodiment for oxygen detection in the polymer matrix. Conversely, an increase in the fluorescence or phosphorescence is however also possible (e.g., in the embodiment for an optical pH measurement). By means of the radiation receiver 9, the sensor circuit 18 detects characteristic parameters, such as the luminescence intensity, the phase shift of the luminescence signal or the decay time of the luminescence, and determines a measured value of the analyte concentration present in the measuring medium 28 by comparison with a calibration function.

The measuring principle of the optical sensor 1 is thus based on the principle of luminescence quenching and is described in more detail below on the basis of the determination of a concentration of dissolved oxygen in the measuring medium 28.

The concentration of oxygen molecules of the sensor membrane 13, thus also the partial pressure of oxygen, in this case corresponds to the concentration or partial pressure in the measuring medium 28. In the measurement process, a first light signal with at least one corresponding first wavelength is initially emitted to excite the luminophore molecules via the radiation source 8. If the light signal hits the luminophore molecules, the latter are excited and emit a second light signal. If oxygen molecules are present in the sensor membrane 13, they attach themselves to the luminophore molecules and influence the emission light signal (for example, different intensity, different phase angle, or different decay time). Thus, for example, energy is transmitted by collision of the oxygen molecule with the luminescent dye. The intensity and decay time of the emission light signal are thereby reduced. This effect is also referred to as "quenching," and the oxygen molecules are in this case what are known as "quenchers." The intensity of the emission light signal depends on the concentration of quencher molecules. Of course, not only oxygen molecules but also other molecules can be determined in this manner, depending on which luminophore is used, for example, nitrogen oxides, sulfur oxides, such as sulfur monoxide or sulfur dioxide, and ozone.

In general, the optochemical sensor 1 measures a physical or chemical measurand. These include, for example, temperature, pressure or viscosities, or in the embodiment as an ion-selective sensor for determining the concentration of an analyte, for instance, pH value, nitrate, chloride, ammonium or potassium.

Figure 3:
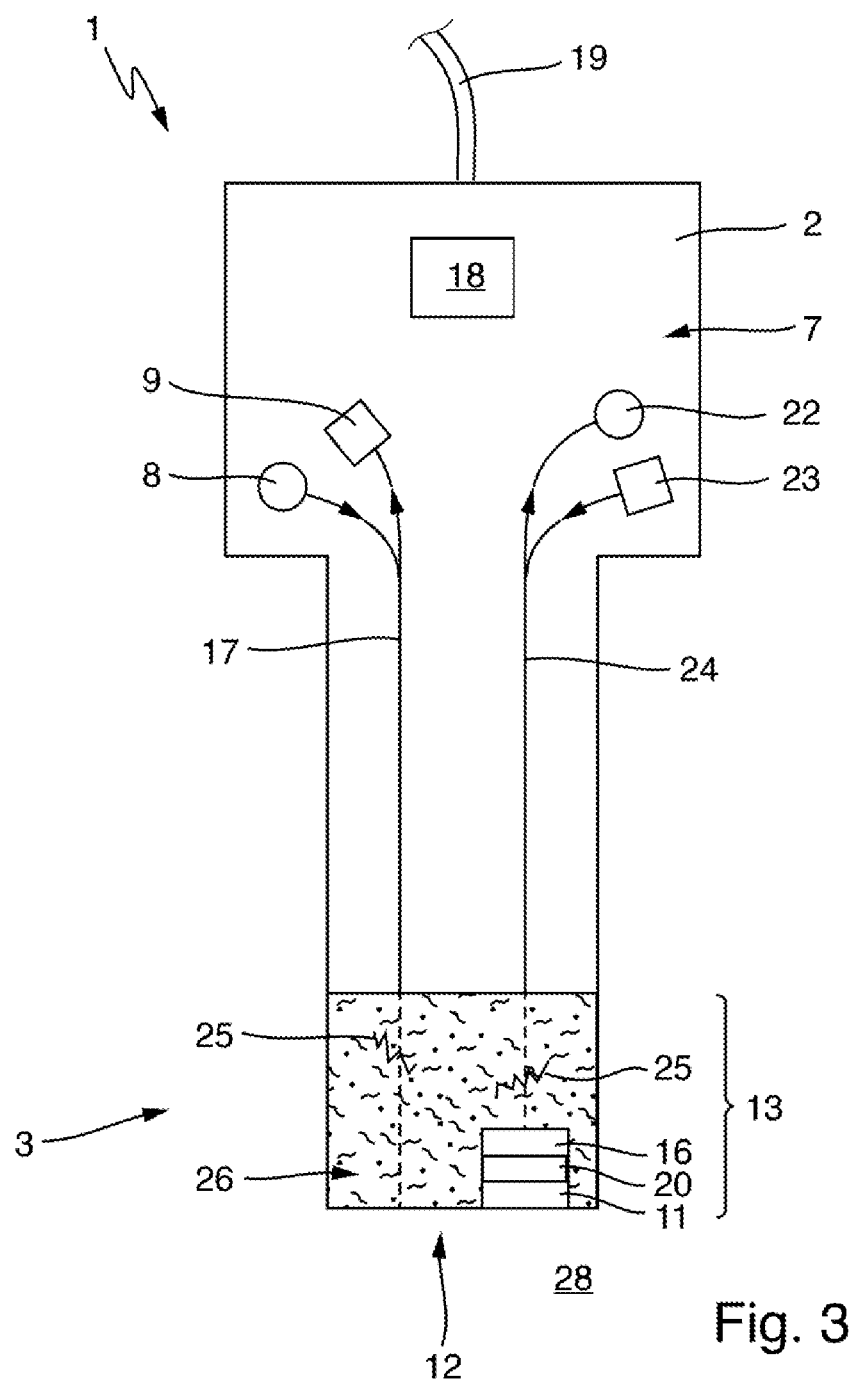
FIG. 3 shows cross-section of an optical sensor.

The sensor membrane 13 can be applied to a substrate or a carrier. The latter can be made of quartz, for example. The sensor membrane 13 can have, inter alia, a luminophore-containing layer, a light-protective layer, an adhesive layer or adhesion-promoting layer and a top layer. The top layer is in this case the layer in contact with the medium. Alternatively or additionally, however, a proton-conducting layer may also be provided. The layers may be arranged in a sandwich-like manner, one above the other as described above. However, it is also possible for individual layers to be covered or even completely encapsulated by other layers, including on the edge side. In FIG. 3, the following structure is selected (from top to bottom): adhesion-promoting layer 16, intermediate layer 20 with optical insulator layer, reflector layer and diffusion layer along with the analyte-sensitive layer 11 with top layer.

The term "analyte-sensitive layer 11" refers to a layer by means of which a physical or chemical measurand can be determined, see below.

As an alternative to the luminescence sensor described, the sensor sport 13 comprises at least one layer which, upon contact with the process variable in the medium, changes at least one property, for example changes color, and absorbs transmission radiation as a function of the process variable.

In general, many different geometries are conceivable. For example, the sensor 1 and the cap 3 have an outer diameter of 12 mm as mentioned. In principle, however, larger geometries are also possible, for example 40 mm. The contours of the removable cap 3 are hygienically, flush sealed by a stainless steel framework structure and do not allow gaps. The latter would falsify measured values. Metallic parts from the interior of the cap 3 are painted dark black as metallic ferrules of the light guide 17 in order to avoid false measurements due to stray light.

Suitable materials for the base body of the cap 3 are in principle all light-permeable and temperature- and moisture-stable materials.

The term "temperature-stable" is to be understood here as: 60° C. and stable for 4 years; 121° C. and autoclave-stable for 30 min and at least 30 cycles; or 140° C. and autoclave-stable for 30 min and at least 30 cycles.

As already mentioned, at least a part of the lateral surface 14 of the sensor cap 3 must consist of a transparent or translucent material; the front side 12 consists of a non-transparent material or of a transparent material that is colored on the inside. Thus, a one-piece shape of the cap 3 is possible. For better cleanability for hygienic requirements or for greater mechanical stability, an overlaid stainless steel sleeve can surround the cap which is optically permeable on the sides. The material transitions here terminate hygienically flush. Suitable materials for the base body are glass ceramic, quartz glass, borosilicate glass, sapphire, sterilizable, preferably non-fluorescent plastics or hybrid materials (inorganic/organic) (e.g., polycarbonate, TOPAS, polysulfones, poly(n-methyl methacrylimides), ethylene norbornene copolymers, polysulfones, poly(n methyl methacrylimides).

The sensor spot 13 is briefly discussed again. The sensitive layer consists of a flexible and the actual sensor spot 3. Suitable thin carriers are materials such as glass (Schott, Dow Corning), PET (polyethylene terephthalate), PEN (polyethylene naphthalate), TOPAS, polycarbonate, ethylene norbornene copolymers, polysulfones, poly(n-methyl methacrylimides). However, activated or non-activated thin plastic films made of, for example, fluorinated polymers, such as PVDF (polyvinylidene difluoride) or ETFE (ethylene tetrafluoroethylene), are also conceivable.

All corrosion-insensitive materials, such as stainless steel, Hastelloy, titanium, are possible as materials for the optional surrounding unit.

In order to apply the sensor spot 13 to the cap 3, all techniques known to the person skilled in the art, such as knife coating, spray coating, dip coating, printing, spin coating, etc. are considered as coating techniques.

A mixture of a pigment mixture and an RTV silicone, such as E41, and a solvent is prepared by spray coating on a, for example, 50 μm thick, polycarbonate film and then coated with a carbon black-silicone mixture. The film is left to cure for a few days, for example at room temperature, for curing. A part of the film is covered with a mask in this case. This step is repeated with, for example, three other pigments. The selection of the matrices can differ here since water-permeable materials, such as hydroethylcellulose or polyurethanes, are used in the case of ionic sensors. In optical sensors, such as the optical measurement of pH or $CO_2$, reflective components are partially also added in order to amplify the intensity of the signal. This results in a film with four separate strips, which ideally terminate flush so that no extraneous light can enter. A possible crosstalk is prevented by an accurate positioning of the measuring beam.

In order to fasten the spot as a film, it is cut to the appropriate size with a laser, wound around the base body and fixed, and combined with the base body by ultrasonic welding. Optionally, the transparent fusion site is coated. Alternatively, a film can also be fastened to the base body by gluing with a silicone or melting or shrinking. Likewise, at least one sensitive layer can be coated onto a film by spray coating, knife coating, spin coating, printing or the like. Alternatively, a coated film is glued, plugged, ultrasonically welded, soldered or melted on the transparent side of the cap in a receptacle. Alternatively, it is inserted via a metal sleeve with a window.

In this way, a plurality of even different materials can be connected to one another.

FIG. 3 shows a cross-section of a claimed optical sensor 1. In one embodiment, an indicator 26 (shown in dotted lines) for detecting polar solvents is additionally added in the sensor membrane 13, for example, for oxygen detection in its hydrophobic matrix. If larger cracks 25 occur due to aging phenomena, they are filled over time by solvents (e.g., water). The indicator dye(s) 26 contained in the membrane 13 can detect the change in the membrane 13 through the change in the decay time/phase angle change.

The sensor according to the present disclosure is thus suitable for measuring the analyte-sensitive substance and for measuring the aging state of the membrane 13. The measurement can take place both simultaneously and alternately in time. In this case, the measurement intervals can be staggered in time or follow one another directly. However, it is recommended that the aging measurement be performed at greater intervals in relation to the analyte measurement. In the course of aging, with initial slow aging of the new membrane, for example, an aging measurement can first be performed only every 10,000th measurement, for example.

Both individual LEDs and OLEDs, or an active matrix (AMOLED/AMLED/AMQ LEDs), can be used as an excitation source 22 for aging detection (direction of light indicated by arrow). The light sources can be made either directly onto the sensor spot 13 or per fiber bundle of a light guide 24 (for example, Y or X bundles, multifiber bundles) or in individual fiber rods. Possible frequencies are 530 nm or 630 nm. For high-temperature applications of constantly >85° C., due to the longer service life, a solution with optical waveguides is recommended for better protection of the electronic components. However, a white source that, for example, radiates onto a filter or filter array is also conceivable. At least two light sources 8, 22 with different excitation wavelengths, e.g., red and blue (see FIG. 3 or FIG. 4), are thus present. Alternatively, a controllable LED is, for example, present, which excites the indicator dye 26 for crack detection (green emitters) with blue light, for example, and excites simultaneously (i.e., also the indicator dye) the oxygen-sensitive indicator 11 (near-infrared emitter) with red light. Through alternating measurement intervals or different modulation frequencies, a superimposed measurement signal and crosstalk in the measurement can be ruled out. In the case of measurements of green-emitting substances (use of the sensor as an algae sensor), a change in intensity or a phase shift can take place. Then, the substance to be measured and the aging must not be measured simultaneously but instead by turns or alternately.

Figure 4:
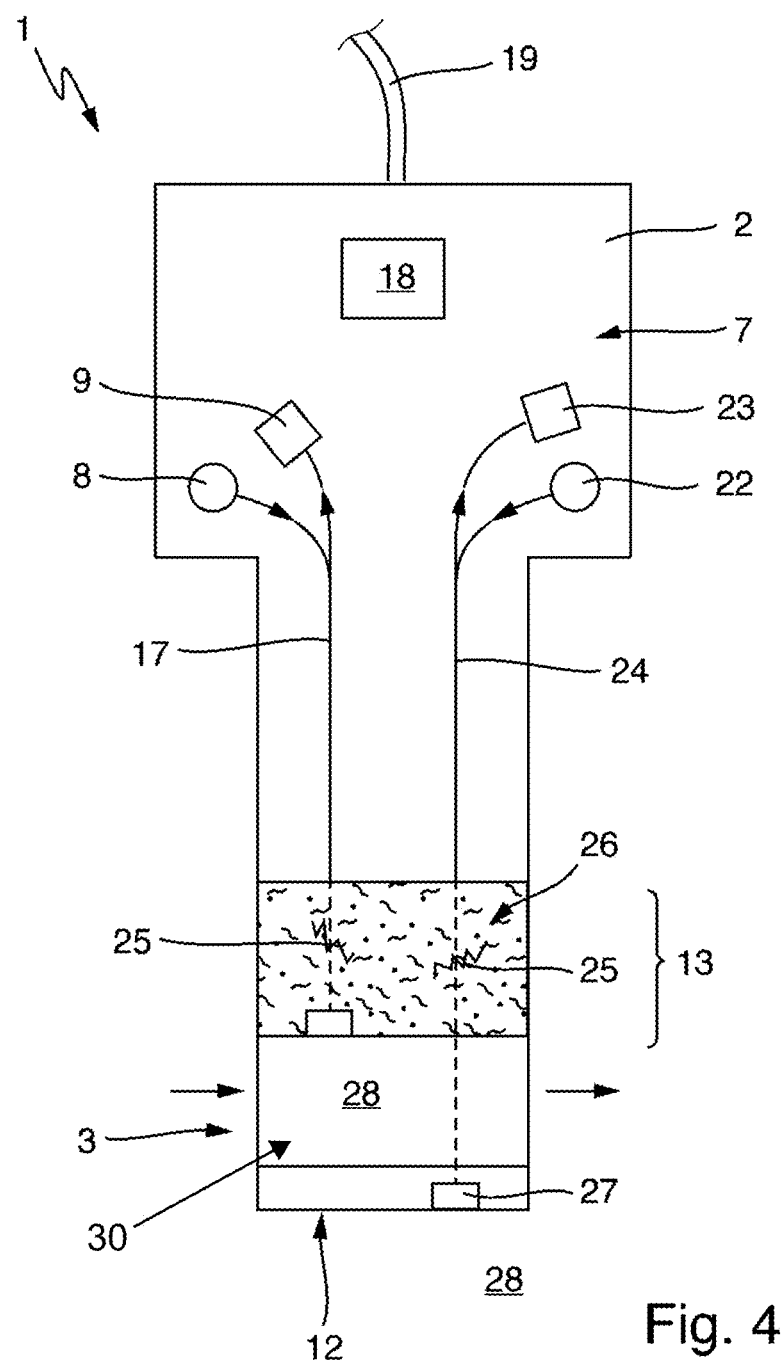
FIG. 4 shows cross-section of an optical sensor in one embodiment.

The detector 23 for aging detection (direction of light indicated by arrow) can be configured similarly to the detector for analyte detection. CCDs or CMOS or photodiodes (or arrays) can be used as detector 9, 23. Integrated component forms are also conceivable within the meaning of the present disclosure. The number of receivers is selected according to the number of light sources. FIG. 3 and FIG. 4 show the embodiment with two units each, but, as mentioned above, one light source can also be used. Only one receiver is then used.

The corresponding filters are to be mounted in front of the excitation source and the detector unit in order to rule out false measurements caused by extraneous light.

The aging state of the entire membrane volume is to be detected. Particularly interesting are cracks 25 on the membrane surface, but also cavities or defects, which can arise, for example, on interfaces and fillers, for example, due to temperature changes or swelling of the membrane 13 in solvents or aging. In one embodiment, different membrane depths can be made visible by different dyes if, for example, a particular dye is mounted in proximity to the substrate and another dye in proximity to the interface. At least two dyes should therefore ideally be used for the determination of crack depth. In principle, however, one dye may sufficient within the objective of the present disclosure.

The entire membrane 13 can thus be examined metrologically for defects 25 (e.g., cracks), or also only a part of the membrane, which is then regarded as representative of the remaining area of the membrane 13. This could be, for example, an edge region, which is, however, dimensioned over a large area, or a uniform island region distributed over the area.

In one embodiment, the membrane 13 comprises ion exchanger materials which prevent volatile basic or acidic gases from causing fault indications.

Suitable indicators 26 for the polarity include: Reichardt's dye/azomerocyanine betaines, merocyanines, pH indicator dyes, europium complex, or benzodiazaboroles. They may be complexly covalently bonded to interfaces.

A europium complex may have shorter decay times in the presence of water. A europium complex may be modified such that it is poorly water-soluble or not at all water-soluble (e.g., is surrounded by the measuring medium at the phase boundary). The europium complex only emits light by dissolving in water. This is particularly the case in the embodiment of the sensor 1 as an ion-selective sensor, particularly an optical pH sensor, since the sensor is surrounded by a large amount of water in this case. In the case of a europium complex, the principle of action of the water detection is based on dissolving the complex in water. The complex is very bright; i.e., it emits strongly. In order to prevent premature leaching, a very small amount of the complex in water is therefore sufficient. The complex is modified such that it is more poorly water-soluble than without modification and therefore does not emit so strongly.

Several specific indicators for solvent and water may be used. For example, one dye is sensitive to solvent (for instance, a triangulenium indicator) and one to solvent and water (for instance, a Reichardt's dye). A differential measurement could thus be used to determine a water proportion, for example.

In one embodiment, two sensors are used: one in the membrane and one in the measurement solution. This is intended, for example, to prevent the sensor from giving a fault indication/warning when an ammonia solution or HCl gas is measured if the indicator reacts only to differences in polarity in the membrane.

Various types of measurement are possible, namely a separate measurement, a superimposed measurement or a planar measurement with at least one LED over the entire spot 13 or at least a partial region of the sensor spot 13. Thereby, the absorption bands, decay times/phase angle difference, or the intensity change in this case.

The measurement can take place both as a luminescence measurement (FIG. 3) and as a colorimetric measurement by absorption. FIG. 4 shows an example of a combination of both measuring principles. Both a luminescence measurement of the analyte-sensitive layer 11 and a colorimetric measurement for crack detection can be performed simultaneously with the sensor 1. For this purpose, the cap 3 comprises a transmission receiver 27. The latter measures the input radiation as it passes through the membrane 13 and determines, through changed absorption or transmission, whether cracks 25 or the like are present. The measuring fluid 28 is located in a channel 30 therebetween (see FIG. 4). The flow direction through the channel 30 is indicated by the two arrows, e.g., from left to right.

Of course, a control measurement for crack checking can also be performed with a luminescence measurement conducted in parallel.

There are various types of making this optically visible. Either the dye is soluble in water and only then fluorescent. This dye is then ideally covalently bonded to a matrix (depending on indicator 26, see above).

Furthermore, the dye undergoes a change in decay behavior as a result of polar solvents like water. In this case, the dye can be embedded an a hydrophilic matrix, which absorbs water when it penetrates into the membrane as waterlogging. Water vapor, on the other hand, is not to be detected.

Alternatively, the dye undergoes a change in the absorption and emission bands as a function of the water proportion in the membrane. Consequently, both parameters can be determined separately or ratiometrically.

All methods indicate significant changes when an environment contains a certain proportion of water or of another characteristic solvent.

Measured are local larger areas that allow conclusions to be drawn regarding solvent inclusions. Consequently, these inclusions should be permanently present in the membrane and should not disappear again after a short drying step. Furthermore, in addition to the solvent inclusions, highly oxidative changed surfaces can also be identified. The latter would also permanently change a dye in its properties (decay time, absorption wavelength, emission wavelength) and have a proportion of the formation of cracks in the membrane.

A particular advantage of the claimed sensor 1 with the sensor membrane 13 thus lies in the predictability of a membrane defect, in a diagnostic function that enables a statement about the reliability of the measured value and in the possibility of a correction calculation which can correct aging phenomena or temperature effects on the new state of a membrane. Then, changes in measured values in the case of dry storage or after autoclaving no longer appear through measured value changes of the partial pressures during oxygen measurement.

The invention claimed is:

1. An optochemical sensor for determining a measurement signal that correlates with a physical or chemical measurand of a measuring fluid, the sensor comprising:
    a housing including at least one immersion region configured to be immersed in the measuring fluid;
    a removable sensor cap including a sensor spot,
    wherein the sensor cap is disposed in the immersion region of the housing, and
    wherein the sensor spot is disposed on a lateral surface of the sensor cap and comprises:
        an analyte-sensitive indicator dye, a luminescence of which is affected by an analyte in the measuring fluid;
        a hydrophobic matrix; and
        a state description indicator contained within the hydrophobic matrix,
        wherein the state description indicator is selected to absorb a polar solvent of the measuring fluid and to undergo a change of luminescence decay behavior or phase angle or a change of absorption and/or emission bands in presence of the polar solvent such that, when the polar solvent is absorbed into the hydrophobic matrix via cracks in the hydrophobic matrix, the cracks are detectable, wherein the cracks reflect an aging state of the sensor spot;

at least one radiation source disposed in the housing and configured to radiate excitation radiation onto the sensor spot, to excite the luminescence of the indicator dye, and to excite a luminescence of the state description indicator;

a first radiation receiver configured to receive reception radiation emitted by the sensor spot;

a second radiation receiver configured to receive excitation radiation from the at least one radiation source after passing through the sensor spot; and a sensor circuit disposed in the housing and electrically connected to the at least one radiation source and the first and second radiation receivers, wherein the sensor circuit is configured to:

control the at least one radiation source;

generate, based on an intensity of luminescence and/or a phase angle of luminescence of the indicator dye detected by the first radiation receiver, a measurement signal representing the physical or chemical measurand in the measuring fluid in contact with the sensor spot; and based on the change of luminescence decay behavior or phase angle or the change of absorption and/or emission bands of the state description indicator in the presence of the polar solvent, detect the cracks in the hydrophobic matrix and thereby determine the aging state of the sensor spot.

2. The sensor of claim 1, wherein the at least one radiation source comprises a first radiation source configured to emit excitation radiation onto the sensor spot and to excite the luminescence of the indicator dye and a second radiation source configured to emit excitation radiation through the sensor spot and toward the second radiation receiver as to excite a luminescence of the state description indicator.

3. The sensor of claim 2, wherein the first radiation source is a red light-emitting diode (LED) and the second radiation source is a blue LED.

4. The sensor of claim 1, wherein the polar solvent is water.

5. The sensor of claim 1, wherein the state description indicator is a Reichardt's dye.

6. The sensor of claim 5, wherein the Reichardt's dye is an azomerocyanine betaine.

7. The sensor of claim 1, wherein the state description indicator is a merocyanine, a europium complex or a benzodiazaborole.

8. The sensor of claim 1, wherein the indicator dye and/or the state description indicator is covalently bonded in a matrix of the sensor spot.

9. The sensor of claim 8, wherein the state description indicator includes a europium complex and is insoluble in water.

10. The sensor of claim 1, wherein the at least one radiation source includes a white light LED.

11. The sensor of claim 1, the sensor further comprising at least one light guide adapted to transmit excitation radiation from the at least one radiation source in a direction of the sensor cap.

12. The sensor of claim 1, wherein the physical or chemical measurand of the measuring fluid is a concentration of an analyte.

13. The sensor of claim 1, wherein the sensor circuit is configured to correct the measurement signal as a function of the aging state.

14. The sensor of claim 1, wherein the sensor cap includes a channel between the lateral surface on which the sensor spot is disposed and an exterior wall of the sensor cap, the channel configured to enable the measuring fluid to enter the channel and/or flow through the channel, wherein the second radiation receiver is disposed across the channel opposite the lateral surface as to receive excitation radiation from the at least one radiation source after passing through the sensor spot and the measuring fluid, and wherein the change of luminescence decay behavior or phase angle or the change of absorption and/or emission bands of the state description indicator in the presence of the polar solvent, indicative of the cracks in the hydrophobic matrix and thereby the aging state of the sensor spot, are detected via the second radiation receiver.

15. A method for performing a measured value correction to determine a measurement signal correlated with a physical or chemical measurand of a measuring fluid, the method comprising:

providing the optochemical sensor according to claim 1;

determining the measurement signal, which correlates with a physical or chemical measurand of the measuring fluid, using the luminescence detected by the first radiation receiver from the analyte-sensitive indicator dye in the sensor spot;

determining the aging state of the sensor spot using the state description indicator in the sensor spot as detected by the second radiation receiver; and correcting the measurement signal as a function of the aging state.

16. The method according to claim 15, wherein the change of luminescence decay behavior or phase angle or the change of absorption and/or emission bands of the state description indicator in the presence of the polar solvent, indicative of the cracks in the hydrophobic matrix and thereby the aging state of the sensor spot, are detected via the second radiation receiver.

* * * * *